US012605993B2

(12) United States Patent
Lee et al.

(10) Patent No.: US 12,605,993 B2
(45) Date of Patent: *Apr. 21, 2026

(54) TAILGATE HINGE MOUNTING STRUCTURE

(71) Applicants:Hyundai Motor Company, Seoul (KR); Kia Corporation, Seoul (KR)

(72) Inventors: HaeHoon Lee, Seoul (KR); Jungho Lee, Suwon-si (KR); Chan Woong Jeon, Incheon (KR); Chulhee Heo, Hwaseong-si (KR); ChangHak Kang, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/951,977

(22) Filed: Nov. 19, 2024

(65) Prior Publication Data

US 2025/0074166 A1 Mar. 6, 2025

Related U.S. Application Data

(63) Continuation of application No. 17/976,366, filed on Oct. 28, 2022, now Pat. No. 12,179,566.

(30) Foreign Application Priority Data

Jan. 6, 2022 (KR) ........................ 10-2022-0002095

(51) Int. Cl.
| | |
|---|---|
| *B60J 5/10* | (2006.01) |
| *B62D 25/08* | (2006.01) |
| *E05D 5/02* | (2006.01) |
| *E05D 5/04* | (2006.01) |

(52) U.S. Cl.
CPC .............. *B60J 5/107* (2013.01); *B62D 25/08* (2013.01); *B60J 5/102* (2013.01); *E05D 5/0207* (2013.01); *E05D 5/043* (2013.01)

(58) Field of Classification Search
CPC ........... B60J 5/107; B60J 5/101; B62D 25/08
USPC ................................. 296/143.08, 56, 193.08
See application file for complete search history.

(56) References Cited

U.S. PATENT DOCUMENTS

| | | | |
|---|---|---|---|
| 9,725,120 | B2 | 8/2017 | Stein et al. |
| 10,899,202 | B2 | 1/2021 | Kuntze |
| 11,358,447 | B2 | 6/2022 | Vanderpool |
| 11,535,299 | B2 | 12/2022 | Kosaka |
| 11,724,576 | B2 | 8/2023 | Tichy et al. |
| 11,760,421 | B2 | 9/2023 | Kamimura et al. |

(Continued)

FOREIGN PATENT DOCUMENTS

| | | | | |
|---|---|---|---|---|
| JP | 2005119408 | A | * | 5/2005 |
| KR | 20070063861 | A | | 6/2007 |
| KR | 20170068833 | A | | 6/2017 |

*Primary Examiner* — Jason S Morrow
(74) *Attorney, Agent, or Firm* — Slater Matsil, LLP

(57) ABSTRACT

An embodiment relates to a tailgate hinge mounting structure that includes a roof rail disposed in a width direction of a vehicle body, a rear end module connected with the roof rail, a tailgate hinge connected with the roof rail and the rear end module, and a bracket bolt connecting the roof rail. The rear end module and the tailgate hinge in a vertical direction of the vehicle body. A bracket reinforcement is provided between the roof rail and the tailgate hinge. The bracket reinforcement is insert-injected together with the rear end module.

20 Claims, 9 Drawing Sheets

(56)             References Cited

U.S. PATENT DOCUMENTS

| | | |
|---|---|---|
| 11,772,707 B2 | 10/2023 | Tsutsumi et al. |
| 11,807,086 B2 | 11/2023 | Uehata et al. |
| 2021/0291907 A1* | 9/2021 | Kosaka ................ B62D 21/152 |
| 2022/0266664 A1 | 8/2022 | Tichy et al. |
| 2022/0324517 A1 | 10/2022 | Kamimura et al. |
| 2023/0158868 A1 | 5/2023 | Kuntze et al. |
| 2023/0211828 A1 | 7/2023 | Lee et al. |
| 2023/0211830 A1 | 7/2023 | Lee et al. |
| 2024/0075795 A1 | 3/2024 | Zhong et al. |

* cited by examiner

TAILGATE HINGE MOUNTING STRUCTURE

CROSS-REFERENCE TO RELATED APPLICATIONS

This application is a continuation of U.S. patent application Ser. No. 17/976,366, filed on Oct. 28, 2022, which claims priority to and the benefit of Korean Patent Application No. 10-2022-0002095 filed in the Korean Intellectual Property Office on Jan. 6, 2022, which applications are incorporated herein by reference.

TECHNICAL FIELD

The present invention relates to a tailgate hinge mounting structure.

BACKGROUND

In general, in order to couple the tailgate, which is a moving part, to the vehicle, the tailgate and the connected hinge are engaged through mechanical bolting in the height direction of the vehicle body.

To ensure durability of the tailgate operation, the tailgate hinge mounting part secures mounting strength by welding multiple layers of vehicle body reinforcement, such as a roof panel, a roof rail, a rear quarter, etc.

The combination of the vehicle body reinforcement and the tailgate hinge is a single-direction connection in the vehicle body height direction, and the reinforcement includes multiple layers to secure strength.

The above information disclosed in this background section is only for enhancement of understanding of the background of the invention, and therefore it may contain information that does not form the prior art that is already known to a person of ordinary skill in the art.

SUMMARY

The present invention relates to a tailgate hinge mounting structure. More particularly, the present invention relates to a tailgate hinge mounting structure with increased strength.

The present invention has been made in an effort to provide a tailgate hinge mounting structure for stably mounting a tailgate hinge without a separate reinforcement by applying a rear end module.

A tailgate hinge mounting structure according to an exemplary embodiment of the present invention may include a roof rail disposed in the width direction of the vehicle body, a rear end module connected with the roof rail, and a tailgate hinge connected with the roof rail and the rear end module.

The roof rail may include a roof rail upper, a roof rail lower connected with the roof rail upper to form a rail closed cross-section.

The tailgate hinge may include a tailgate bracket, and a hinge body rotatably mounted to the tailgate bracket, and a bracket support hole for supporting the tailgate bracket may be formed in the rear end module.

The tailgate hinge mounting structure according to an exemplary embodiment of the present invention may further include a bracket bolt connecting the roof rail, the rear end module and the tailgate hinge in the vertical direction of the vehicle body.

The tailgate hinge mounting structure according to an exemplary embodiment of the present invention may further include a bracket reinforcement provided between the roof rail and the tailgate hinge.

A bracket reinforcement hole into which the bracket bolt is inserted may be formed to the bracket reinforcement.

The bracket reinforcement may be connected with the rear end module.

The bracket reinforcement may be insert-injected together with the rear end module.

The rear end module may include an end module bracket support surface to support the tailgate bracket, and an end module reinforcement side bent from the end module bracket support surface and formed in the vehicle body height direction. And the bracket reinforcement may be formed in an "L" shape with its cross-section in surface contact with the end module bracket support surface and the end module reinforcement side.

The roof rail may include a rail reinforcement formed protrude to the inside thereof, and the rear end module may include a rear end protrude portion formed protrude to be inserted into the rail reinforcement.

The rear end module may further include a protrude portion rib connected to the rear end protrude portion.

The tailgate hinge mounting structure according to an exemplary embodiment of the present invention may further include a rail bolt connecting the rail reinforcement and the rear end protrude portion.

The rail bolt may be connected along the length direction of the vehicle body.

According to the tailgate hinge mounting structure according to an exemplary embodiment of the present invention, the tailgate hinge can be stably mounted without a separate reinforcement by applying a rear end module.

In addition, the effects that can be obtained or predicted by an exemplary embodiment of the present invention will be disclosed directly or implicitly in the detailed description of an exemplary embodiment of the present invention. That is, various effects predicted according to an exemplary embodiment of the present invention will be disclosed within a detailed description to be described later.

BRIEF DESCRIPTION OF THE DRAWINGS

Since these drawings are for reference in explaining an exemplary embodiment of the present invention, the technical idea of the present invention should not be construed as being limited to the accompanying drawings.

DETAILED DESCRIPTION OF ILLUSTRATIVE EMBODIMENTS

Figure 1:
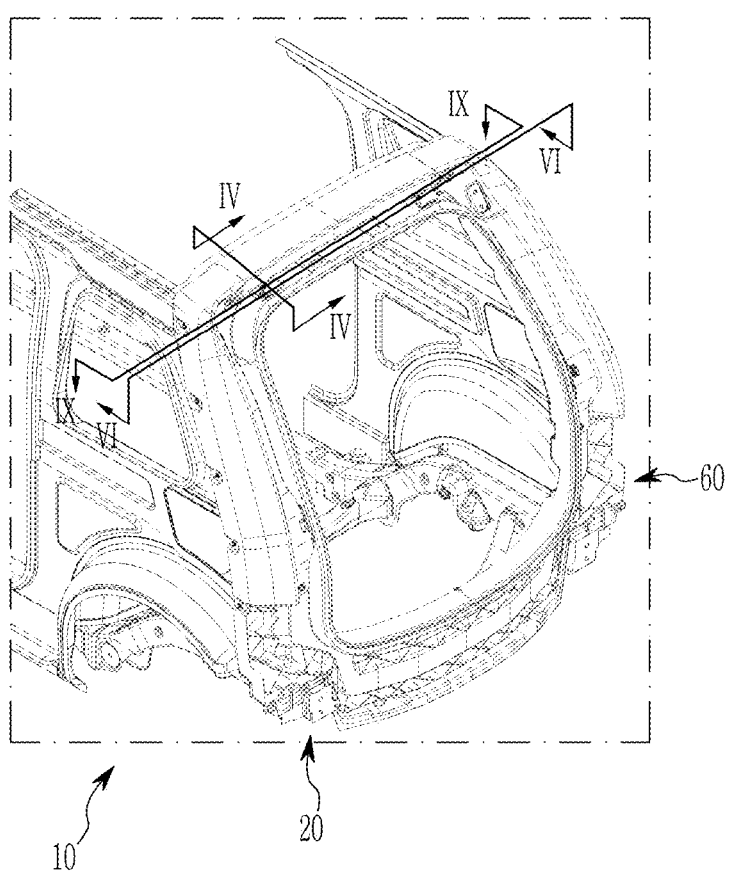
FIG. 1 is a partial perspective view of a vehicle body to which a tailgate hinge mounting structure according to an exemplary embodiment of the present invention may be applied.

The present invention will be described more fully here-inafter with reference to the accompanying drawings, in which exemplary embodiments of the invention are shown.

As those skilled in the art would realize, the described embodiments may be modified in various different ways, all without departing from the spirit or scope of the present invention.

In order to clearly explain the present invention, parts irrelevant to the description are omitted, and the same reference numerals are assigned to the same or similar elements throughout the specification.

Since the size and thickness of each component shown in the drawings are arbitrarily indicated for convenience of description, the present invention is not necessarily limited to that shown in the drawings, and the thickness is enlarged to clearly express various parts and regions.

In addition, in the following detailed description, the names of the components are divided into first, second, etc., in order to classify the components in the same relationship, and the order is not necessarily limited in the following description.

Throughout the specification, when it is said that a certain part includes certain constituent elements, this means that other constituent elements may be further included, rather than excluding other constituent elements, unless specifi-cally stated otherwise.

In addition, terms such as part or means described in the specification mean a unit of a comprehensive configuration that performs at least one function or operation.

When a part, such as a layer, film, region, plate, etc., is "on" another part, it includes not only the case where it is directly above the other part, but also the case where there is another part in between.

In contrast, when an element is referred to as being "directly on" another element, there are no intervening elements present.

An exemplary embodiment of the present invention will hereinafter be described in detail with reference to the accompanying drawings.

Figure 2:
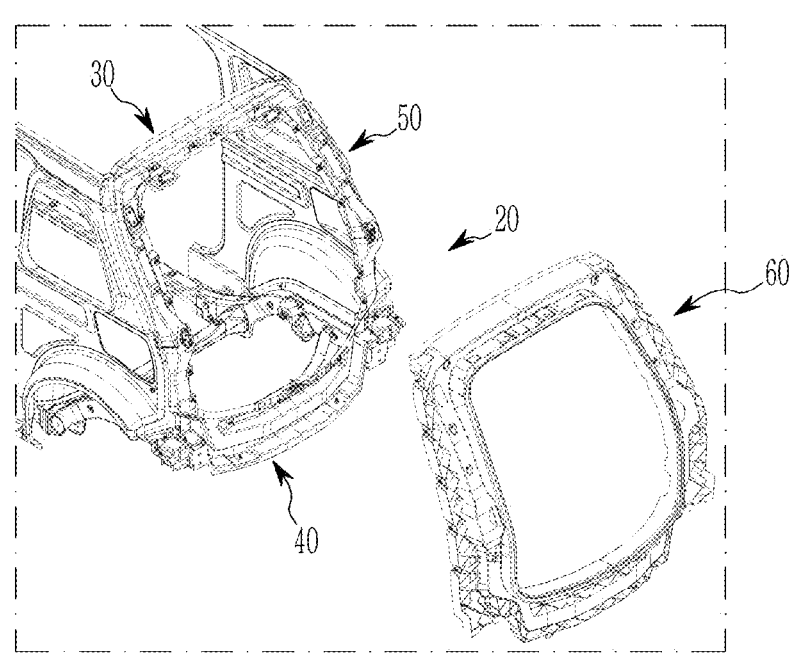
FIG. 2 is a partially exploded perspective view of a vehicle body to which a tailgate hinge mounting structure according to an exemplary embodiment of the present invention may be applied.
Figure 3:
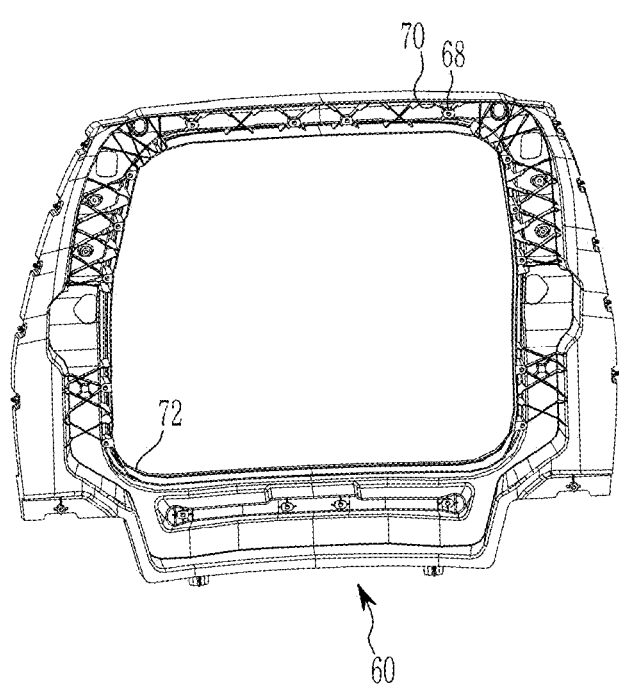
FIG. 3 is a perspective view of a rear end module that may be applied to a tailgate hinge mounting structure according to an exemplary embodiment of the present invention.

FIG. 1 is a partial perspective view of a vehicle body to which a tailgate hinge mounting structure according to an exemplary embodiment of the present invention may be applied, FIG. 2 is a partially exploded perspective view of a vehicle body to which a tailgate hinge mounting structure according to an exemplary embodiment of the present invention may be applied, and FIG. 3 is a perspective view of a rear end module that may be applied to a tailgate hinge mounting structure according to an exemplary embodiment of the present invention.

Referring to FIG. 1 to FIG. 3, a vehicle body 10 to which a tailgate hinge mounting structure according to an exem-plary embodiment of the present invention may be applied includes a rear vehicle body assembly 20 and a rear end module 60 connected to a rear vehicle body assembly 20 in the length direction of the vehicle body 10.

The rear vehicle body assembly 20 may include a roof rail 30 disposed in the width direction of the vehicle body, a quarter completion 50 connected to both ends of the roof rail 30 respectively, and a back panel 40 connecting the both quarter completion 50.

As shown in the drawing, the rear vehicle body assembly 20 may form a vehicle body rear structure of a closed shape by combining the roof rail 30, the quarter completions 50 and the back panel 40.

However, it is not limited thereto, but it is also applicable to structures with a partially open shape.

The parts forming the rear vehicle body assembly 20 may be joined by welding or the like as a metal material.

However, in the tailgate hinge mounting structure accord-ing to an exemplary embodiment of the present invention, the present invention is not limited thereto, and some configurations are made of non-metal material plastics, for example, carbon fiber reinforced plastics (CFRP) may be applied.

The rear end module 60 may have a closed shape sur-rounding the rear vehicle body assembly 20.

As shown in the drawing, the rear end module 60 may be formed in a closed shape that completely encloses the rear vehicle body assembly 20, but is not limited thereto. The rear end module 60 with an open shape in some configura-tions is also applicable.

The rear end module 60 may further include an end module inner reinforcement 72 formed protrude to the inside.

The end module inner reinforcement 72 may increase the cross-section coefficient of the rear end module 60 by the protrude shape, and form a vehicle body rear structure of a closed shape along the inner direction of the rear end module 60.

In addition, the end module inner reinforcement 72 stably supports the tail gate (not shown) to suppress vibration or noise generation by the tail gate during vehicle operation.

Figure 4:
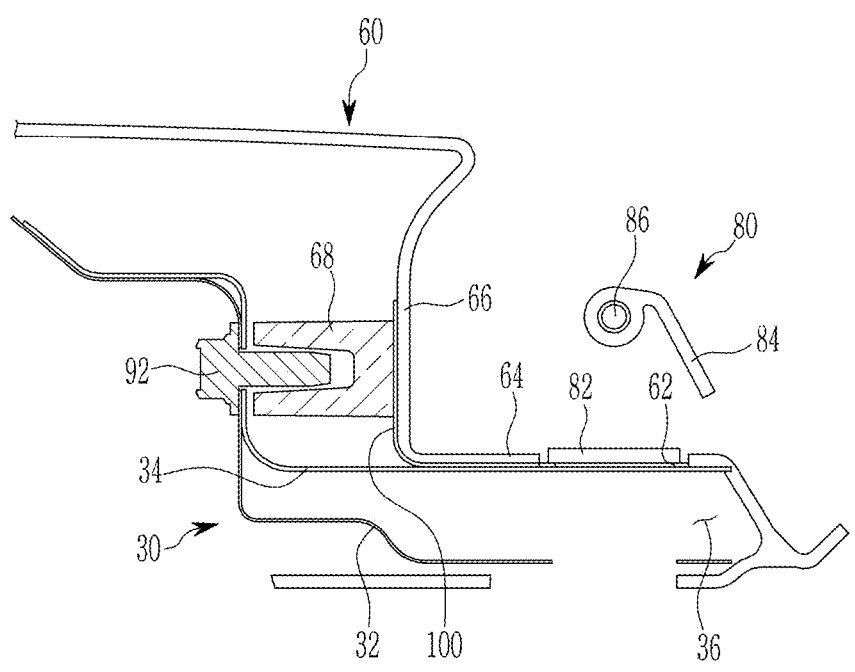
FIG. 4 is a cross-sectional view along the IV-IV line in FIG. 1.
Figure 5:
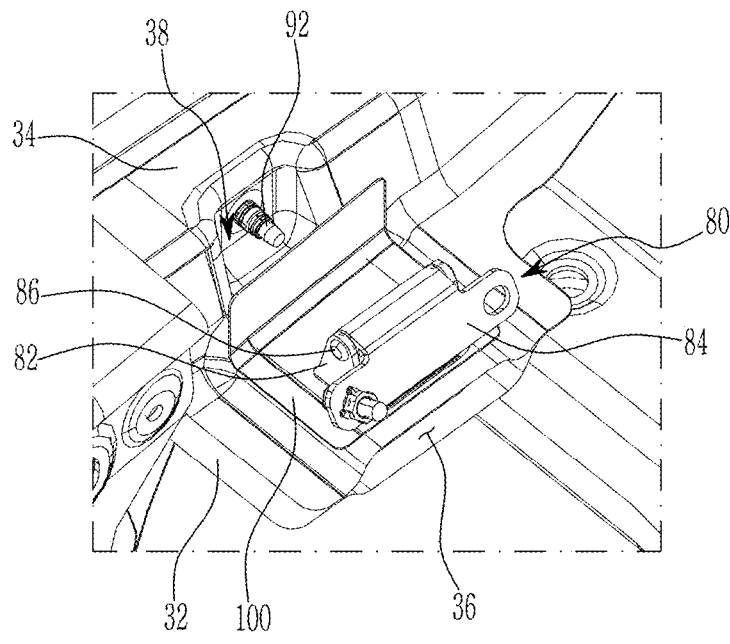
FIG. 5 is a partial perspective view excluding the rear end module of a tailgate hinge mounting structure according to an exemplary embodiment of the present invention.
Figure 6:
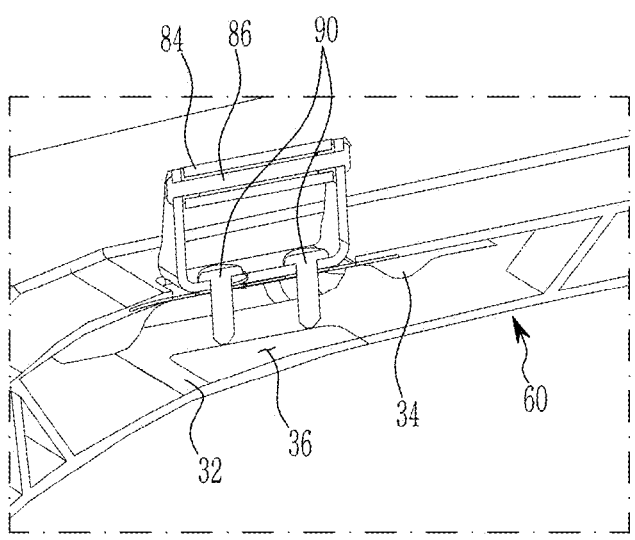
FIG. 6 is a cross-sectional view along the VI-VI line of FIG. 1.

FIG. 4 is a cross-sectional view along the IV-IV line in FIG. 1, FIG. 5 is a partial perspective view excluding the rear end module of a tailgate hinge mounting structure according to an exemplary embodiment of the present invention, and FIG. 6 is a cross-sectional view along the VI-VI line of FIG. 1.

Referring to FIG. 1 to FIG. 6, the tailgate hinge mounting structure according to an exemplary embodiment of the present invention may include the roof rail 30, the rear end module 60 connected with the roof rail 30 and a tailgate hinge 80 connected with the roof rail 30 and the rear end module 60.

A tail gate (not shown) may be mounted on the tailgate hinge 80.

In the tailgate hinge mounting structure according to an exemplary embodiment of the present invention, the tailgate hinge 80 is connected with the roof rail 30 and the rear end module 60 to increase the connection force of the tailgate hinge 80 without additional reinforcement of the mounting part.

The roof rail 30 may include a roof rail upper 34 and a roof rail lower 32 connected with the roof rail upper 34 to form a rail closed cross-section 36.

The rail closed cross-section 36 may increase the cross-section coefficient to increase the strength of the mounting portion of the tailgate hinge 80.

Figure 7:
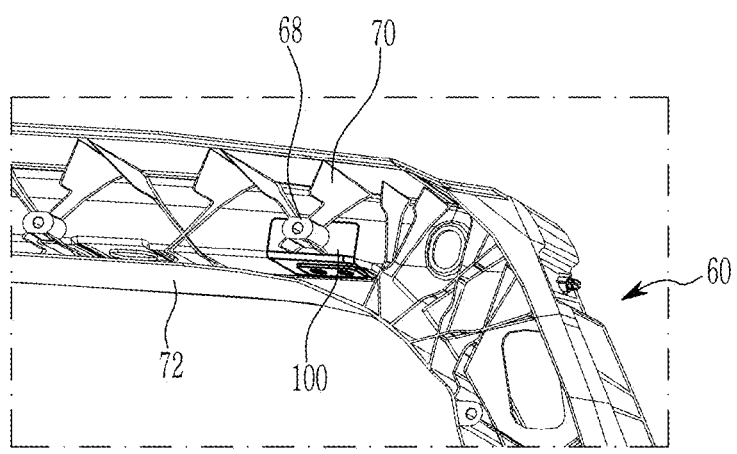
FIG. 7 is a partial perspective view of a rear end module that may be applied to a tailgate hinge mounting structure according to an exemplary embodiment of the present invention.
Figure 8:
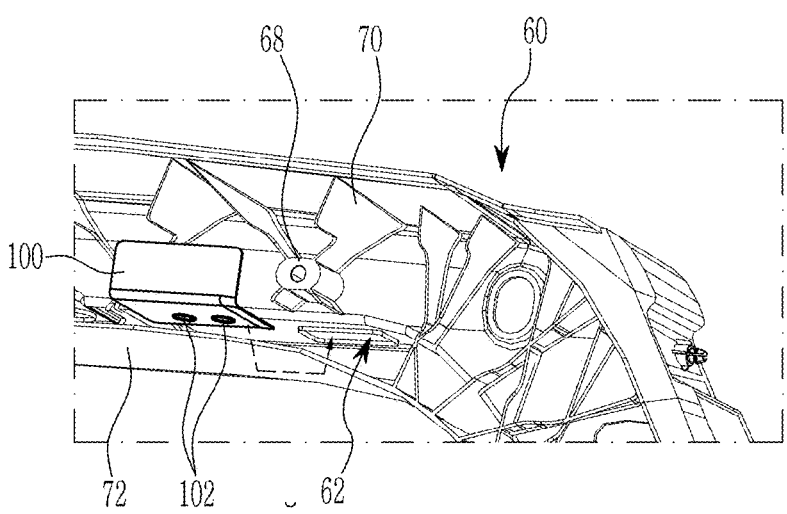
FIG. 8 is a partially exploded perspective view of a rear end module that may be applied to a tailgate hinge mounting structure according to an exemplary embodiment of the present invention.

FIG. 7 is a partial perspective view of a rear end module that may be applied to a tailgate hinge mounting structure according to an exemplary embodiment of the present invention, and FIG. 8 is a partially exploded perspective view of a rear end module that may be applied to a tailgate hinge mounting structure according to an exemplary embodiment of the present invention.

Referring to FIG. 1 to FIG. 8, the tailgate hinge 80 may include a tailgate bracket 82 and a hinge body 84 rotatably mounted to the tailgate bracket 82.

The tailgate bracket 82 and the hinge body 84 may be rotatably connected via a hinge pin 86.

Referring to FIG. 8, a bracket support hole 62 for supporting the tailgate bracket 82 may be formed in the rear end module 60.

The tailgate bracket 82 may be inserted and fixed into the bracket support hole 62.

The tailgate hinge mounting structure according to an exemplary embodiment of the present invention may further include a bracket bolt 90 connecting the roof rail 30, the rear end module 60 and the tailgate hinge 80 in the vertical direction of the vehicle body 10.

The bracket bolt 90 integrally connects the roof rail 30, the rear end module 60 and the tailgate hinge 80 to increase the connection strength of the tailgate hinge 80.

The tailgate hinge mounting structure according to an exemplary embodiment of the present invention may further include a bracket reinforcement 100 provided between the roof rail 30 and the tailgate hinge 80.

A bracket reinforcement hole 102 into which the bracket bolt 90 is inserted may be formed to the bracket reinforcement 100.

The bracket reinforcement 100 may be connected with the rear end module 60.

The bracket reinforcement 100 may be insert-injected together with the rear end module 60.

That is, the bracket reinforcement 100 may be formed as a separate configuration from the rear end module 60 to improve the connection force of the tailgate hinge 80 as well as the bracket reinforcement 100 and the rear end module 60 are insert-injected to improve the connection force of the tailgate hinge 80.

In addition, since the bracket reinforcement 100 and the rear end module 60 are integrally formed, the assemble work of the tailgate hinge 80 may be further simplified.

The rear end module 60 may include an end module bracket support surface 64 to support the tailgate bracket 82 and an end module reinforcement side 66 bent from the end module bracket support surface 64 and formed in the vehicle body height direction.

The bracket reinforcement 100 may be formed in an "L" shape with its cross-section in surface contact with the end module bracket support surface 64 and the end module reinforcement side 66.

That is, the bracket reinforcement 100 may increase the strength of both the horizontal direction and the vertical direction of the rear end module 60 to increase the connection strength of the rear end module 60 and the tailgate hinge 80.

The bracket reinforcement 100 may be located at a position where the bracket support hole 62 is formed.

Figure 9:
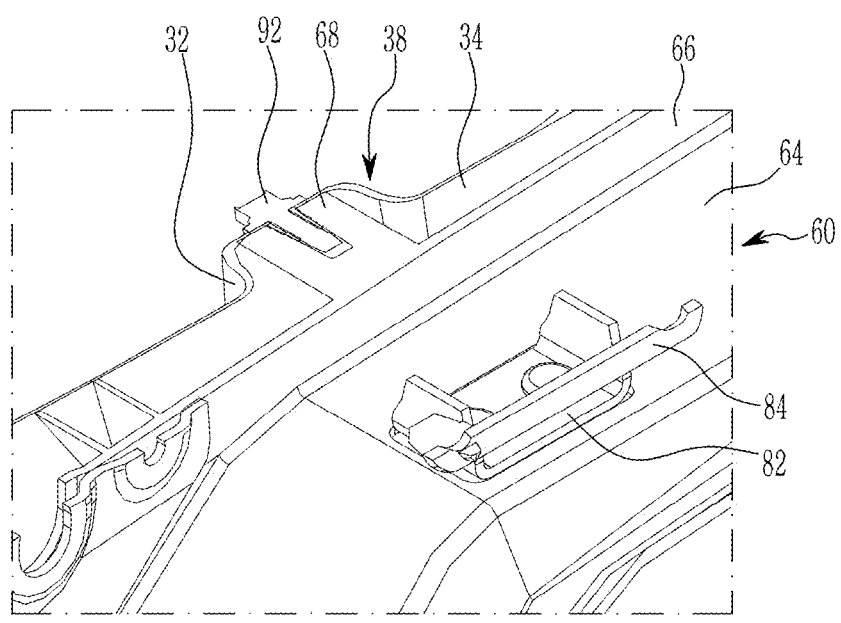
FIG. 9 is a cross-sectional view along line IX-IX of FIG. 1.

FIG. 9 is a cross-sectional view along line IX-IX of FIG. 1.

The roof rail 30 may include a rail reinforcement 38 formed protrude to the inside thereof, and the rear end module 60 may include a rear end protrude portion 68 formed protrude to be inserted into the rail reinforcement 38.

As shown in FIG. 4 and FIG. 5, the rail reinforcement 38 is formed by connecting the roof rail lower 32 and the roof rail upper 34, and the strength may be increased by forming protrude in the inner direction of the roof rail 30.

Referring to FIG. 3, FIG. 7 to FIG. 9, the rear end protrude portion 68 is inserted inside the rail reinforcement 38 in a protrude shape so that movement in the vehicle width direction with respect to the roof rail 30 of the rear end module 60 may be restricted.

The tailgate hinge mounting structure according to an exemplary embodiment of the present invention may further include a rail bolt 92 connecting the rail reinforcement 38 and the rear end protrude portion 68.

The rail bolt 92 may connect the rail reinforcement 38 and the rear end protrude portion 68 to firmly connect the rear end module 60 and the roof rail 30.

The rail bolt 92 may be connected along the length direction of the vehicle body 10.

The rail bolt 92 connects the rail reinforcement 38 and the rear end protrude portion 68 along the length direction of the vehicle body 10 to form a double connection structure.

That is, the bracket bolt 90 connects the roof rail 30, the rear end module 60 and the tailgate hinge 80 in the vertical direction of the vehicle body 10, and the rail bolt 92 connects the rail reinforcement 38 and the rear end protrude portion 68 along the length direction of the vehicle body 10, so that the tailgate hinge 80 may be more firmly connected.

The rear end module 60 may further include a protrude portion rib 70 connected to the rear end protrude portion 68.

The protrude portion rib 70 may reinforce around the rear end protrude portion 68 to increase the connection strength of the rail reinforcement 38 and the rear end protrude portion 68.

As described above, according to the tailgate hinge mounting structure according to an exemplary embodiment of the present invention, the tailgate hinge may be stably mounted without a separate reinforcement by applying a rear end module.

In addition, according to the tailgate hinge mounting structure according to an exemplary embodiment of the present invention, it is possible to increase the strength of the tailgate hinge mount part by increasing the coupling strength in the vertical direction and the length direction of the vehicle body through the double bolt coupling.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

The following reference numbers can be used in conjunction with the drawings.

10: vehicle body
20: rear vehicle body assembly
30: roof rail
32: roof rail lower
34: roof rail upper
36: rail closed cross-section
38: rail reinforcement
40: back panel
50: quarter completion
60: rear end module
62: bracket support hole
64: end module bracket support surface
66: end module reinforcement side
68: rear end protrude portion
70: protrude portion rib
72: end module inner reinforcement -continued 80: tailgate hinge
82: tailgate bracket
84: hinge body
86: hinge pin
90: bracket bolt
92: rail bolt
100: bracket reinforcement
102: bracket reinforcement hole

What is claimed is:

1. A tailgate hinge mounting structure comprising:
a roof rail disposed in a width direction of a vehicle body;
a rear end module connected with the roof rail;
a tailgate hinge connected with the roof rail and the rear end module;
a bracket bolt connecting the roof rail, the rear end module and the tailgate hinge in a vertical direction of the vehicle body; and
a bracket reinforcement provided between the roof rail and the tailgate hinge, wherein the bracket reinforcement is insert-injected together with the rear end module.

2. The tailgate hinge mounting structure of claim 1, wherein the roof rail comprises a rail reinforcement configured to protrude to the inside thereof.

3. The tailgate hinge mounting structure of claim 2, wherein the rear end module comprises a rear end protrude portion configured to be inserted into the rail reinforcement.

4. The tailgate hinge mounting structure of claim 3, wherein the rear end module further comprises a protrude portion rib connected to the rear end protrude portion.

5. The tailgate hinge mounting structure of claim 3, further comprising a rail bolt connecting the rail reinforcement and the rear end protrude portion, wherein a shank of the rail bolt is connected along a length direction of the vehicle body.

6. The tailgate hinge mounting structure of claim 1, wherein the roof rail comprises:
a roof rail upper; and
a roof rail lower connected with the roof rail upper to form a rail closed cross-section.

7. The tailgate hinge mounting structure of claim 1, wherein the tailgate hinge comprises:
a tailgate bracket; and
a hinge body rotatably mounted to the tailgate bracket, wherein a bracket support hole for supporting the tailgate bracket is formed in the rear end module.

8. The tailgate hinge mounting structure of claim 1, wherein the rear end module comprises:
an end module bracket support surface configured to support a tailgate bracket; and
an end module reinforcement side bent from the end module bracket support surface and formed in the vertical direction,
wherein the bracket reinforcement is formed in an "L" shape with its cross-section in surface contact with the end module bracket support surface and the end module reinforcement side.

9. A tailgate hinge mounting structure comprising:
a roof rail disposed in a width direction of a vehicle body;

a rear end module connected with the roof rail, the rear end module being made of plastic material;
a tailgate hinge connected with the roof rail and the rear end module; and
a bracket reinforcement insert-injected together with the rear end module.

10. The tailgate hinge mounting structure of claim 9, wherein the roof rail comprises a rail reinforcement configured to protrude to the inside thereof.

11. The tailgate hinge mounting structure of claim 10, wherein the rear end module comprises a rear end protrude portion configured to be inserted into the rail reinforcement.

12. The tailgate hinge mounting structure of claim 11, further comprising a rail bolt connecting the rail reinforcement and the rear end protrude portion.

13. The tailgate hinge mounting structure of claim 12, wherein the rail bolt is connected along a length direction of the vehicle body.

14. The tailgate hinge mounting structure of claim 9, wherein the rear end module comprises:
an end module bracket support surface configured to support a tailgate bracket; and
an end module reinforcement side bent from the end module bracket support surface and formed in a vertical direction of the vehicle body.

15. A tailgate hinge mounting structure comprising:
a roof rail disposed in a width direction of a vehicle body, wherein the roof rail comprises a rail reinforcement configured to protrude to the inside thereof;
a rear end module connected with the roof rail, wherein the rear end module comprises a rear end protrude portion configured to be inserted into the rail reinforcement, the rear end module being made of plastic material;
a tailgate hinge connected with the roof rail and the rear end module; and
a rail bolt connecting the rail reinforcement and the rear end protrude portion, wherein a shank of the rail bolt is connected along a length direction of the vehicle body.

16. The tailgate hinge mounting structure of claim 15, wherein the roof rail comprises:
a roof rail upper; and
a roof rail lower connected with the roof rail upper to form a rail closed cross-section.

17. The tailgate hinge mounting structure of claim 15, wherein the tailgate hinge comprises:
a tailgate bracket; and
a hinge body rotatably mounted to the tailgate bracket, wherein a bracket support hole for supporting the tailgate bracket is formed in the rear end module.

18. The tailgate hinge mounting structure of claim 15, further comprising a bracket bolt connecting the roof rail, the rear end module, and the tailgate hinge in a vertical direction of the vehicle body.

19. The tailgate hinge mounting structure of claim 1, wherein the tailgate hinge comprises a tailgate bracket and a hinge body rotatably mounted to the tailgate bracket.

20. The tailgate hinge mounting structure of claim 19, wherein the roof rail comprises a roof rail upper and a roof rail lower connected with the roof rail upper.

* * * * *